July 5, 1938. R. TAYLOR ET AL Re. 20,786
TELEPHONE SYSTEM
Original Filed Oct. 16, 1931 7 Sheets-Sheet 1
Fig. 1.
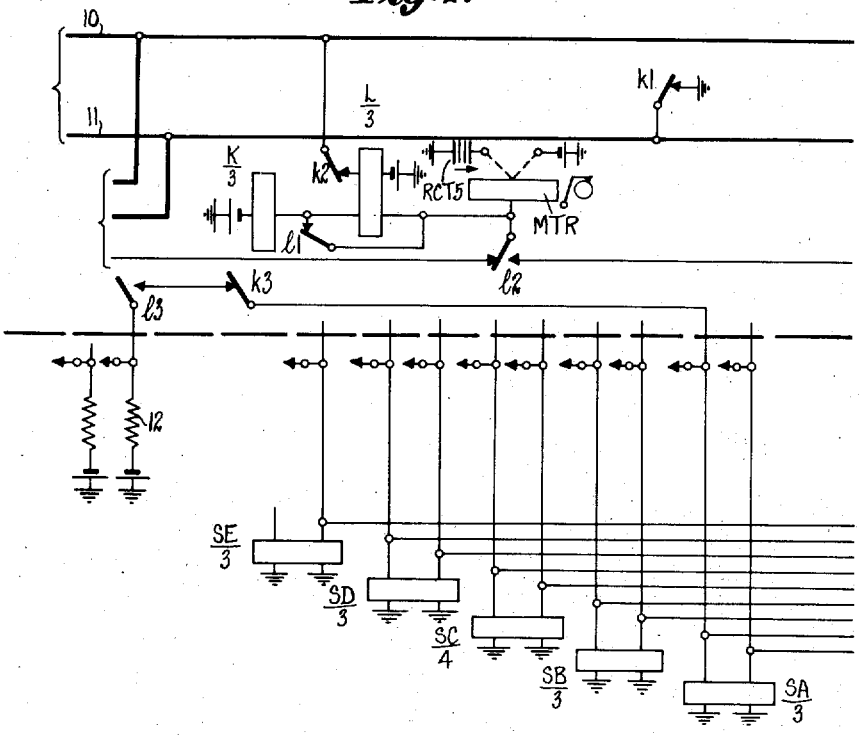
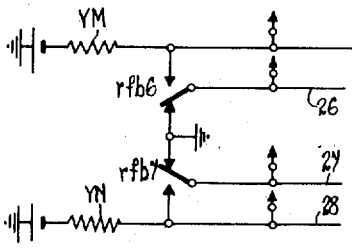
Fig. 6.
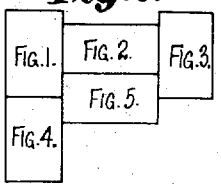
Inventors
Reginald Taylor
James Alfred Mason
Wm Watts Dwell
Atty.

TELEPHONE SYSTEM
Original Filed Oct. 16, 1931 7 Sheets-Sheet 2
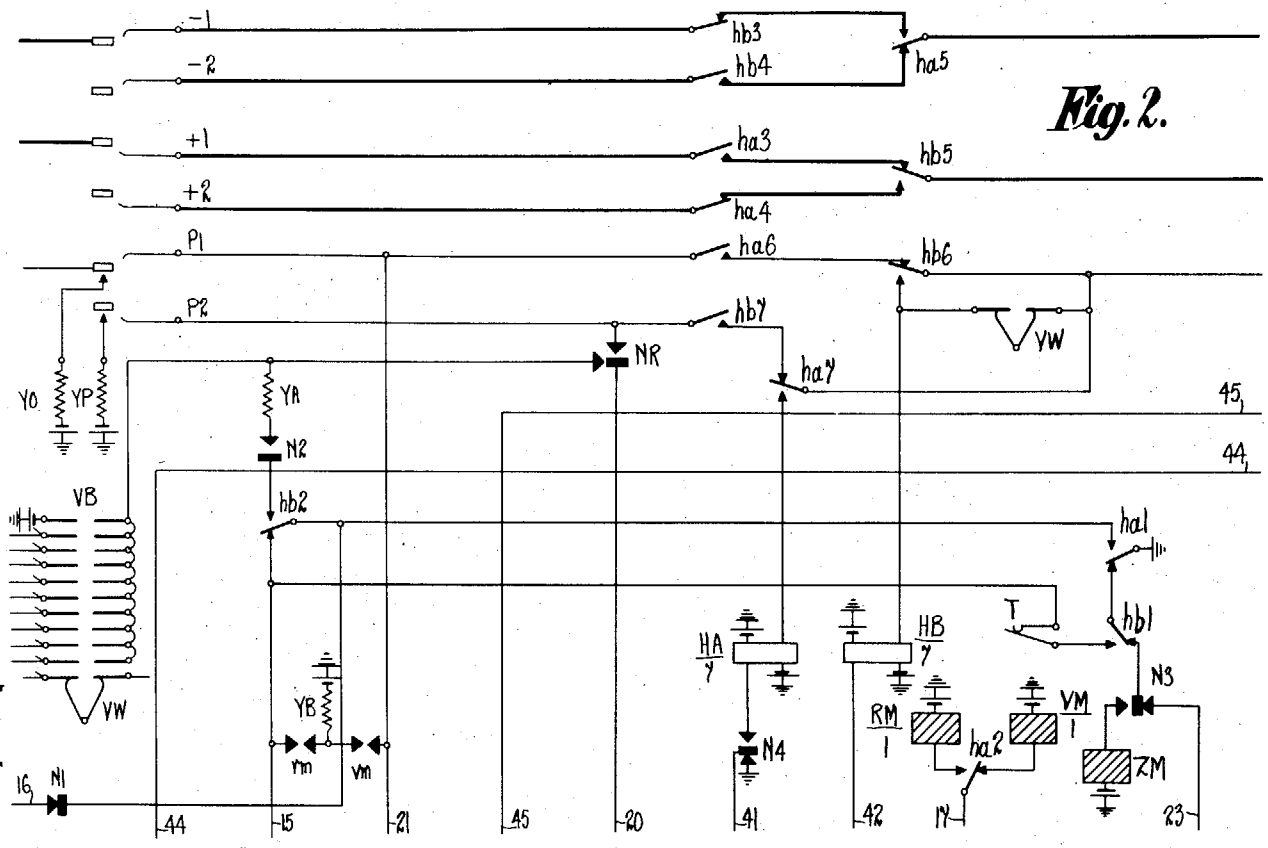
Inventors
Reginald Taylor
James Alfred Mason
Wm Walter Curtis
Atty.

TELEPHONE SYSTEM

Original Filed Oct. 16, 1931 7 Sheets-Sheet 3

Inventors
Reginald Taylor
James Alfred Mason
Mr. Walter Owen.
Atty.

Inventors
Reginald Taylor
James Alfred Mason
Mc Walter Drew
Atty.

TELEPHONE SYSTEM
Original Filed Oct. 16, 1931 7 Sheets-Sheet 5
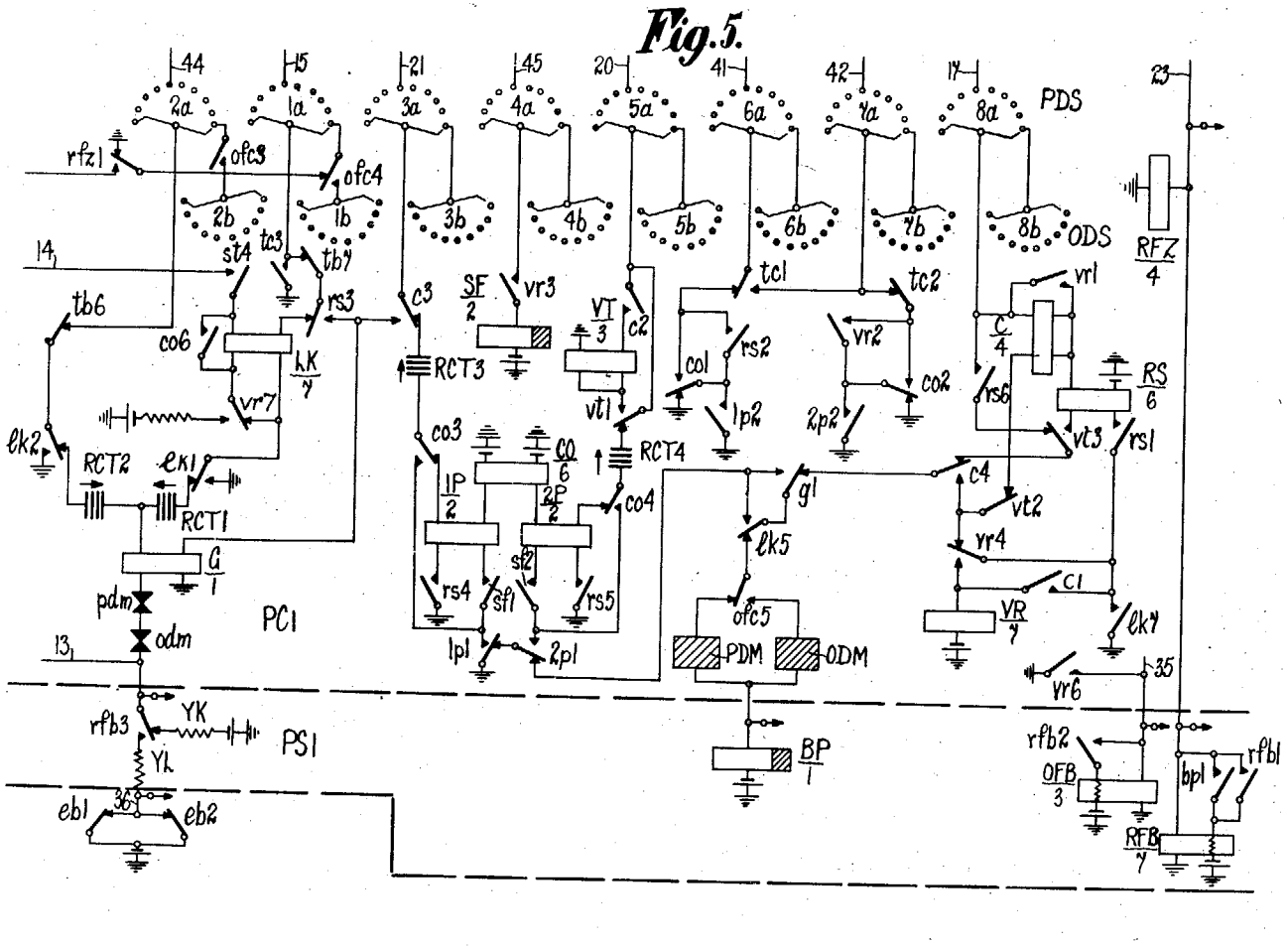
Inventors
Reginald Taylor
James Alfred Mason
Mc Walter Owen
Atty.

TELEPHONE SYSTEM

Original Filed Oct. 16, 1931 7 Sheets-Sheet 6

Inventors
Reginald Taylor
James Alfred Mason
Mr Watts Dwew.
Atty.

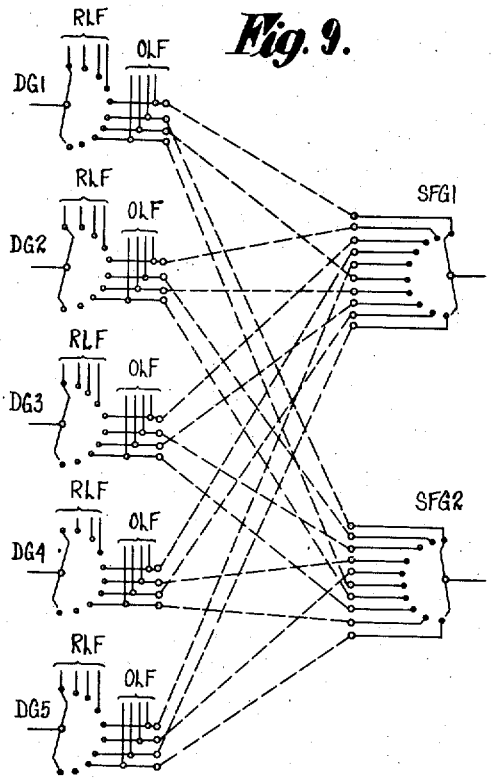
Inventors
Reginald Taylor
James Alfred Mason
Wm Walter Owen.
Atty.

Reissued July 5, 1938

Re. 20,786

UNITED STATES PATENT OFFICE 20,786

TELEPHONE SYSTEM

Reginald Taylor, Liverpool, and James Alfred Mason, Cheshire, England, assignors to Associated Telephone and Telegraph Company, Chicago, Ill., a corporation of Delaware Original No. 1,914,540, dated June 20, 1933, Serial No. 569,160, October 16, 1931. Application for reissue March 21, 1936, Serial No. 70,176. In Great Britain November 1, 1930

22 Claims. (Cl. 179—18)

The present invention relates to telephone systems and is more particularly concerned with telephone systems in which finder switches are employed for extending a calling subscriber's line to a first numerical switch. An object of the invention is to reduce the number of first numerical switches required without lowering the grade of service.

According to one feature of the invention in a telephone system including a group of primary finder switches, certain finder switches in the group are directly connected to corresponding first numerical switches while other finder switches in the group have access to first numerical switches over secondary finder switches.

According to another feature of the invention in a telephone system including primary and secondary finder switches, the secondary finder switches are arranged only to be taken into use under conditions of heavy traffic.

According to a further feature of the invention in a telephone system including two groups of finder switches, the finder switches in each group comprise two classes and the finder switches in the second class are adapted to be taken into use only when the finder switches in the first class of both groups of finder switches are busy.

The invention will be better understood from the following description of one method of carrying it into effect, reference being had to the accompanying drawings comprising Figs. 1–9.

Figure 7:
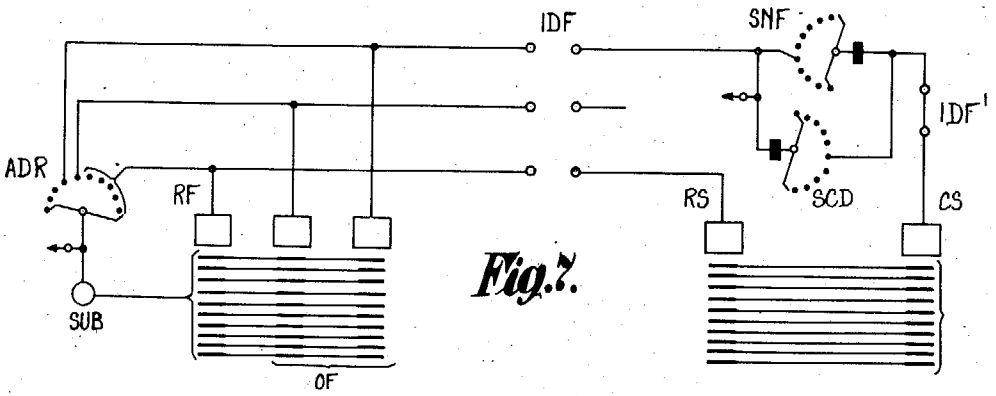
Figure 8:
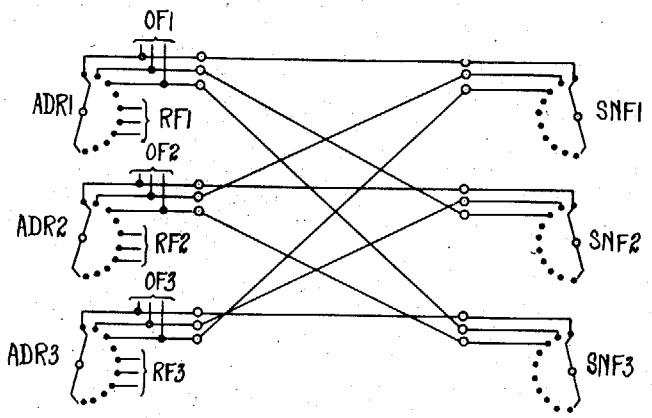

Figs. 1–5 when arranged as shown in Fig. 6 form a detailed circuit of an embodiment of the invention, while Figs. 7, 8 and 9 illustrate in schematic form the trunking arrangements.

In order that the general outline of the scheme shall be more readily understood, before entering into the detailed circuit operation, a description will first be given of the trunking arrangements and for this purpose reference will be had to Figs. 7 and 8.

Generally speaking, in telephone systems of any size employing finder switches to establish connection with the calling subscriber's lines it has been found convenient to divide the calling lines into 200-line groups each of which is served by a separate group of finder switches controlled from common equipment associated with the finders by one or more distributor switches.

Each 200-line group has hitherto been provided with finders sufficient in number to cater for the maximum traffic likely to be encountered by that group, and as the arrangements are generally such that the group selectors are directly connected with the finders, it will be appreciated that the same number of group selectors had to be provided. It is well recognized, however, that the peak busy conditions of all the 200-line groups never occur at the same instant and it will be readily appreciated that a considerable reduction may be effected in the number of group selectors required providing that the arrangements are such that an adequate number of group selectors is always available to cater for the peak busy condition in any finder group. These conditions are satisfied by the present arrangement in that certain of the finders in the groups for use under normal traffic conditions will be directly connected to group selectors, while other finders in the group which are taken into use only during the peak busy condition are not directly connected to selectors, but are arranged to have access by way of non-numerical switches to selectors located in a common group. With this arrangement a considerable reduction is effected in the number of group selectors required while since they are always available to any particular finder group during its peak condition the same standard of service will be maintained.

Referring now particularly to the trunking diagram in Fig. 7, it should be explained that a typical calling subscriber's instrument is designated by SUB, this normally having access by way of the distributor ADR to a regular group of finder switches designated RF which is connected by way of the intermediate distributing frame IDF to a regular group of selectors designated RS. Under abnormal conditions, however, when all the regular finders are taken into use the subscriber will then have access to overflow finders OF which are extended by way of the intermediate distributing frame IDF and secondary finder switches such as SNF to selectors in a common group designated CS. Each secondary finder switch is directly connected by way of the distributing frame IDF′ to a selector in the common group. More than one secondary finder switch may, of course, be provided in any particular group, in which case the secondary finders are allotted for use in turn by a secondary distributor switch such as SCD. In order to improve the grade of service still further, it is preferably arranged that no two finders in the same overflow group shall have access to the same selector or group of selectors in the common group.

To illustrate more clearly the manner in which this latter arrangement may be carried into effect a further trunking diagram is shown in Fig. 8 of three finder groups served respectively by the distributors ADR1, ADR2 and ADR3. Each switch it will be seen has access to its own particular regular group of line finders designated RF1, RF2, and RF3, while during overflow conditions the switch has access to its overflow group of finders which are connected to one or other of the secondary finder groups designated SNF1, SNF2 and SNF3. Considering now particularly the group served by the distributor ADR1, it will be seen that the first overflow finder is connected to the group including the secondary finder SNF1, by way of which it may be connected to one of a sub-group of common selectors. The second overflow finder served by the distributor ADR1 is connected to the group including the secondary finder SNF2 so that this overflow finder may be connected to one of a sub-group of selectors in the common group which sub-group comprises different selectors from those in the sub-group accessible to the first overflow finder. Similarly the third overflow finder of the group in question will be connected to the third secondary finder group so as to have access to a still further sub-group of common selectors. A similar procedure is carried out in respect of the second and third finder groups served by the distributors ADR2 and ADR3 so that it will be readily apparent that the grade of service is improved by arranging as far as possible for each overflow finder in a particular group to have access to common selectors in different sub-groups.

Figure 3:
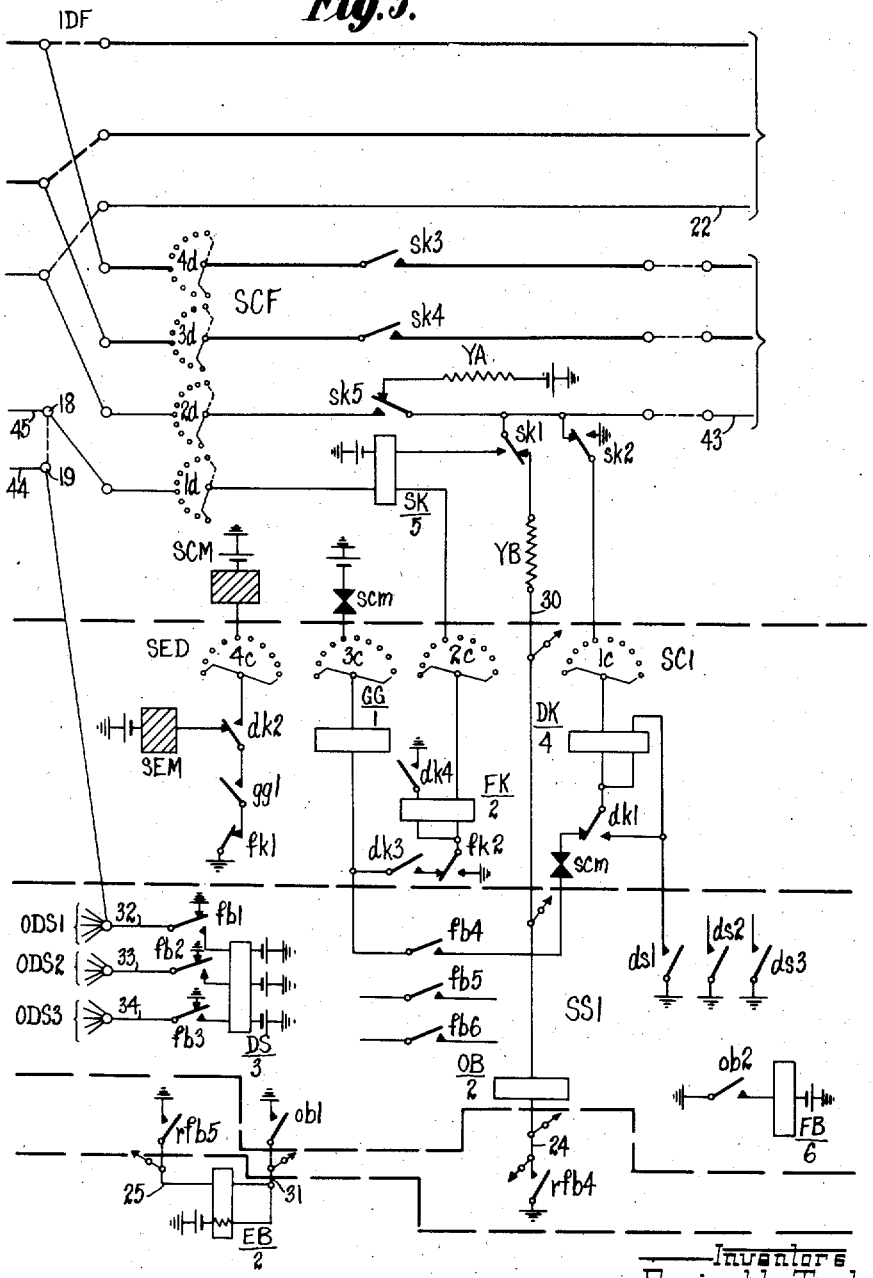

Referring now to the assembled circuit it should be explained that the necessary changes of connection according as to the conditions under which the finders are to be used are made at the intermediate distributing frame IDF shown in Fig. 3, and in this instance the dotted connections shown are suitable for regular finders which are directly associated with first selectors, while the connections shown in full lines apply to overflow finders in which case connection with a first selector is made by way of a secondary finder. For the purpose of this description it will first be assumed that the finder shown is one of a regular group and accordingly the dotted cross connections will apply and there is no question of operation of a secondary finder at this time.

Referring now particularly to Fig. 1 of the assembled circuit when the calling subscriber removes his receiver to originate a call, a circuit is completed by way of his telephone over conductors 10 and 11 to operate the line relay L in circuit with the resting armatures *k1* and *k2*, thereupon at armatures *l'* and *l2* marking the rotary bank of all finders with battery extended through the windings of relays K and L in series, and moreover at armature *l3* extending battery by way of a resistance such as 12 (provided one per calling level) over the resting armature *k3* to mark in the vertical bank multiple of all finders, the level in which the calling line is situated. It will be seen from the drawings that the vertical bank VB extends to 5 relays viz. relays SA, SB, SC, SD and SE, which are provided with two windings each, one per level, and these relays are arranged to be operated from the marking battery extended by relay L to complete a start circuit for one or other of the primary control sets such as PC1 shown in Fig. 5 having access by way of a distributor switch or switches to all the finders in the group.

As will be seen from Fig. 2, the finders employed are provided with two sets of wipers arranged to hunt over an upper and lower level simultaneously. It will be appreciated that each relay SA, SB, SC, SD, SE will serve 40 lines comprising two levels of twenty lines each.

In this particular example the 200-line group of subscribers is sub-divided into three sub-groups of 80, 40 and 80 lines respectively, and for this purpose it is arranged that relays SA and SB operated from the vertical bank contacts 1 to 4 are normally effective in starting the first primary control set PC1, relay SC is normally effective in starting the second primary control set PC2 and relays SD and SE are normally effective in starting the third primary control set PC3.

Figure 4:
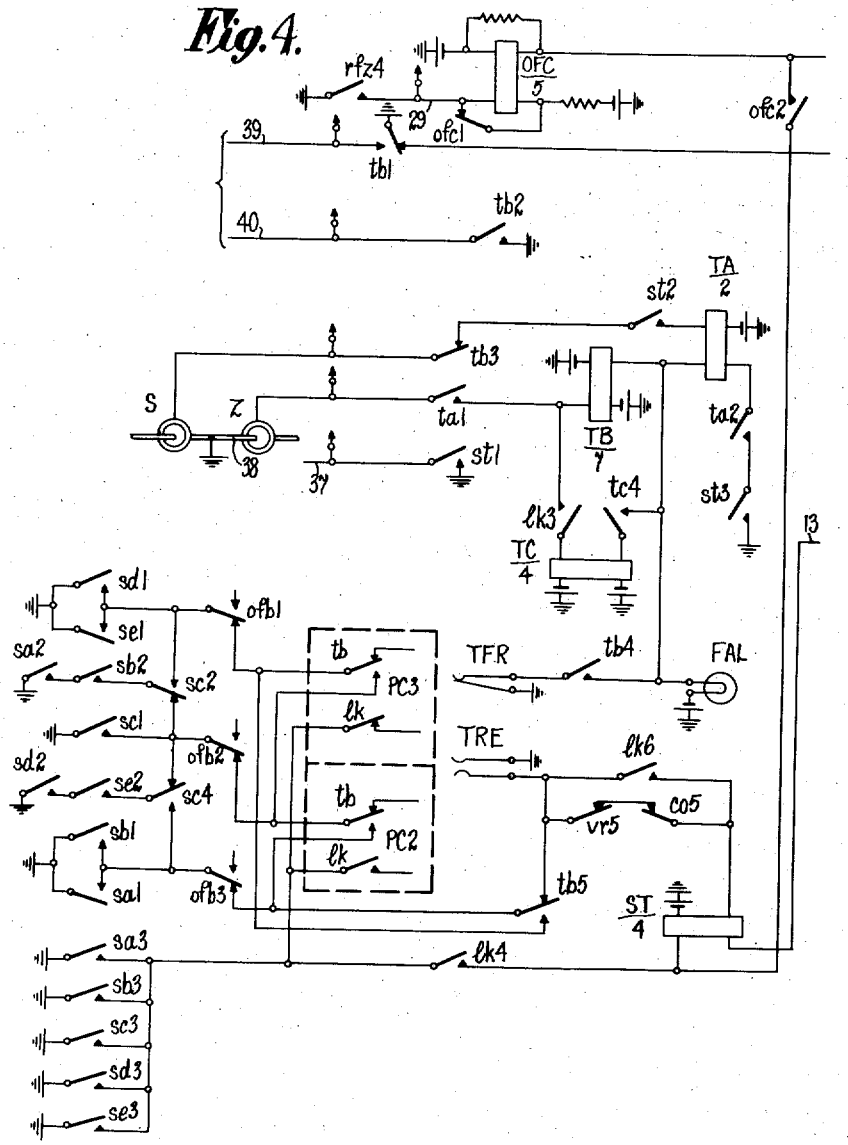

In cases of very heavy calling in the first 80 line sub-group, relays SA and SB will be operated together and from a consideration of the arrangement of their armatures shown in Fig. 4 it will be seen that under these conditions primary control sets PC1 and PC2 will be set in operation together. Moreover the circuit arrangements are such that in combination with the other level start relays SC, SD and SE this facility is extended to the other sub-groups so that primary control sets will be taken into use to some extent in accordance with the density of the calling rate in the corresponding sub-group of lines. In the drawings primary control set PC1 and its associated distributors PDS and ODS only are shown in detail, while the start circuits to primary control sets PC2 and PC3 are shown enclosed by a dotted rectangle in Fig. 4.

Returning now to the operation of, for example, relay SA which is energized in parallel with the marking battery to the vertical bank VB, at armature *sa1*, Fig. 4, a circuit is completed by way of the resting armature *ofb3*, armatures *tb5*, *vr5*, *co5*, right-hand winding of relay ST, conductor 13, armature *rfb3* to battery by way of the resistance YK. Relay ST in operating, at armatures *st1*, *st2* and *st3*, Fig. 4, prepares the circuit of a delayed alarm change-over device comprising relays TA, TB and TC, and at armature *st4*, Fig. 5, completes the following circuit for energizing relay LK of the primary control set PC1 providing that the distributor PDS has already preselected an idle regular finder: earth at the resting armature *tb1*, Fig. 4, conductor 14, armature *st4*, left-hand winding of relay LK, armature *vr7*, right-hand low resistance winding of relay LK, armatures *rs3* and *tb7*, wiper *1a* and bank contact of the primary distributor switch PDS, conductor 15, armature *hb2* of the selected finder, off-normal springs N1, conductor 16 to battery by way of a resistance YM which is common to a number of finders.

It should be mentioned that the primary distributor PDS is arranged to preselect a finder in the following manner: if the finder engaged by the distributor is busy, wiper *1a* will encounter earth which operates relay G in a circuit including resting armature *lk1*, metal rectifier RCT1, left-hand high resistance winding of relay G, interrupter springs *pdm* of the primary distributor and *odm* of the overflow distributor to battery by way of resistance YK. The function of the metal rectifiers RCT1 and RCT2 is to prevent the false operation of relay LK and the circuit for such false operation will be more readily apparent from the description of the selection of an overflow finder. Owing to its high resistance, relay G alone is operated in this circuit and at armature *g1* energizes the driving magnet PDM of the primary distributor over the circuit; earth at the resting armature *1p1*, armatures *2p1*, *g1*, *1k5* and *ofc5*, winding of the magnet PDM to battery by way of the low resistance relay BP which is common to all the primary control sets. The magnet in energizing prepares for the advancement of the wipers *1a* to *8a* into engagement with the next set of bank contacts and at the conclusion of its stroke operates the associated interrupter springs *pdm* thereupon opening the circuit of relay G which releases. In this manner interaction will take place between relay G and magnet PDM so that the wipers will be automatically rotated until the first idle finder is encountered.

In order to obviate the possibility of incorrect operation owing to a disconnection in the bank engaged by wiper *1a* it is arranged that when a call is initiated a test is made over wiper *1a* for battery from the resistance YM or alternatively YN. If battery is found by wiper *1a*, relay G is shunted and relay LK operates on both its windings in series over the circuit: earth, armature *tb1*, conductor 14, armature *st4*, left-hand winding of relay LK, armature *vr7*, right-hand winding of relay LK, armatures *rs3* and *tb7*, wiper *1a*, conductor 15, armature *hb2*, off-normal springs N1, conductor 16, resistance YM to battery. If, however, the finder is not marked idle by the presence of battery, relay G operates in series with the left-hand winding of relay LK whereupon the distributor steps into engagement with the next idle finder.

Relay LK in operating, at armature *lk1* connects direct earth to its low resistance right-hand winding which maintains the relay operated and serves to mark the contact encountered by wiper *1a* as busy, at armature *lk2* prepares a circuit which is effective later in operating relay SF, at armature *lk3* prepares a further point in the circuit to the delayed alarm changeover device, at armature *lk4* provides an alternative holding circuit for the start relay ST on its left-hand winding, at armature *lk5* prepares a stepping circuit to the vertical magnet of the selected finder, at armature *lk6* closes a parallel path in the circuit of the right-hand winding of relay ST and at armatures *lk7* completes the following circuit for energizing relay C in series with the vertical magnet VM: earth at armature *lk7*, armatures *vr4* and *vt2*, both windings of relay C in series, wiper *8a* and bank contact, conductor 17, armature *ha2*, winding of the vertical magnet VM of the selected finder to battery. Owing to the high resistance of the upper winding of relay C the latter only is operated in this circuit and at armature *c1* operates relay VR, at armature *c2* prepares a circuit to relay VT, at armature *c3* connects the right-hand winding of relay G in circuit with the vertical magnet springs *vm*, and at armature *c4* provides an alternating energizing circuit to the vertical magnet and relay C. Relay VR in operating, at armature *vr1* short-circuits the upper high resistance winding of relay C to increase the current in the circuit sufficiently for the energization of the vertical magnet VM, at armature *vr2* operates the switching relay HB of the finder on its left-hand winding in a circuit including the wiper *7a* and bank contact of the distributor switch PDS, at armature *vr3* prepares a further point in the circuit to relay SF, at armature *vr4* completes a locking circuit for itself, at armature *vr5* (Fig. 4) opens a point in the initial energizing circuit of relay ST, at armature *vr6* connects earth to a common conductor extending to relay OFB which is operated only when all the overflow finders are busy and at armature *vr7* completes a locking circuit for relay LK on its left-hand winding. The locking circuit to relay LK is deferred until relay VR is operated so that if two primary control sets switch on to the same finder, one of the LK relays may be permitted to fall away and continue the searching operation of its associated distributor since the adjustment of these relays is such that two cannot hold operated to the marking battery of the same finder over their low resistance right-hand windings. Upon the operation of the switching relay HB, at armature *hb1* the right-hand winding of relay LK is short-circuited and a point is opened in the circuit to the release magnet ZM at armature *hb2* the marking earth on the contact engaged by wiper *1a* is disconnected by the off-normal springs N1 and is thereby prevented from maintaining other finders busy by multiple connections over conductor 16.

Since the finder selected is assumed to be one of the regular group then the terminals 18 and 19 on the intermediate distributing frame IDF, Fig. 3, will be connected together by a local strap in the manner suggested by the dotted conductor and consequently upon the operation of relay VR, relay SF will be operated from earth at the operated armature *lk2*, Fig. 5, in a circuit including the wipers *2a* and *4a* and bank contacts of the switch PDS, thereby at armatures *sf1* and *sf2* preparing a locking circuit to the testing relays 1P and 2P which are later connected to the testing wipers P1 and P2 of the selected finder. Consequent upon the energization of the vertical magnet VM in series with the low resistance winding of relay C, the wipers of the finder will be raised to the first level and at the conclusion of the magnet stroke the springs *vm* will close thereby operating relay G of the primary control set on its right-hand winding in a circuit including the wiper *3a* and bank contact. Relay G in operating, at armature *g1* opens the circuit to the vertical magnet so that it will be appreciated that interaction will take place between the magnet and the relay so that the line and test wipers of the finder together with the vertical wiper VW will be raised to the desired level. On the first vertical step the off-normal springs N1, N2, N3 and N4 are operated, springs N1 disconnect the common marking battery YM from this particular finder so that it shall remain available to other finders, springs N2 prepare a circuit for the operation of relay VT, springs N3 prepare a point in the circuit to the release magnet ZM and springs N4 prepare a circuit to the switching relay HA.

When the calling level is located, wiper VW will encounter a contact to which battery has been applied by the operation of relay L of the calling line whereupon a circuit is completed for operating relay VT from battery at the vertical bank and wiper, resting springs NR, conductor 20, bank contact and wiper *5a* of the switch PDS, operated armature *c2*, both windings of relay VT in series to earth. Relay VT in operating, at armature *vt1* short-circuits its high resistance right-hand winding and remains held on its low resistance left-hand winding which also serves to busy the vertical level against other finders and prevents two finders switching on the same level, at armature *vt2* opens the circuit to relay C and the vertical magnet VM to terminate the vertical movement, and at armature *vt3* prepares a circuit for relay RS which is operated on the release of relay C over the circuit: earth at the resting armature 1p1, armatures 2p1, lk5, g1, c4 and vt3, left-hand winding of relay RS, armature vr1, wiper 8a and bank contact of the switch PDS, conductor 17, armature ha2, winding of the vertical magnet VM to battery. Owing to its high resistance, relay RS only is operated in this circuit and at armature rs1 completes a locking circuit for its right-hand winding to earth at armature lk7, at armature rs2 operates the other switching relay HA of the selected finder over wiper 6a and bank contact of the switch PDS. Relay HA in operating, at armature ha1 extends earth by way of the operated armature hb2, off-normal springs N2 and comparatively low resistance YA to maintain the busy condition to the bank contact of the level selected and serves to short-circuit relay VT which then releases. Relay HA moreover at armature ha2 transfers the driving circuit to the rotary magnet RM and upon the release of relay VT, earth from resting armature 1p1 will be extended over a circuit previously traced as far as the resting armature c4 and from thence by way of the resting armature vt3, operated armature rs6, wiper 8a and bank contact, conductor 17, operated armature ha2, winding of the rotary magnet RM to battery. In this manner the rotary wipers of the finder will be advanced into engagement with the first set of bank contacts in the selected level. The vertical wiper VW is loosely connected to the shaft so that it remains in engagement with the vertical bank during the rotary movement.

During the first rotary step of the finder the normal rotary springs NR are operated to disconnect the original operating circuit for relay VT and to extend the winding of the test relay 2P in circuit with the test wiper P2. At the end of the magnet stroke, the associated springs rm close to complete a circuit over conductor 15 for energizing the interrupter relay G, Fig. 5, on its right-hand winding and this relay thereupon opens the energizing circuit to the rotary magnet RM at its armature g1 to prepare for the advancement of the wipers into engagement with the next set of bank contacts. In this manner interaction will take place between the magnet and relay G until one of the testing wipers P1 or P2 encounters the marking battery which it will be remembered is extended by way of the windings of relays L and K in series in the calling subscriber's circuit.

Assuming now that the test wiper P1 encounters the marked bank contact, a circuit will be completed over conductor 21, bank contact and wiper 3a of the switch PDS, Fig. 5, armature c3, metal rectifier RCT3, armature co3, left-hand high resistance winding of relay 1P to earth at armature rs4. Owing to its high resistance, relay 1P only is operated in this circuit and at its armature 1p1 opens the circuit to the rotary magnet RM to terminate the rotary movement and at the same time completes a circuit for holding relay 1P on its right-hand winding in series with the left-hand winding of relay CO which is also operated. Relay CO in operating, at armatures co1 and co2 transfers the holding circuits for the switching relays HA and HB to the control of the testing relays 1P and 2P whichever may be operated, at armatures co3 and co4 completes a circuit for the extension of direct earth to the test wiper P1 or P2 whichever has encountered the marked contact, at armature co5 (Fig. 4) opens a point in the original energizing circuit to the start relay ST and at armature co6 short-circuits the locking winding of relay LK so that it then releases.

Consequent upon the connection of direct earth to the test wiper P1, relay K in the calling subscriber's line circuit is operated in series with the lower winding of relay L which holds, thereby at armatures k1 and k2 clearing the calling loop of its battery and earth connections and at armature k3 opens the start circuit to the primary control set. Since the test relay 1P only is operated the switching relay HA is maintained from earth at armature 1p2 while the other switching relay HB is permitted to release owing to the opening of its circuit at armature co2. Armatures hb3, hb5 and hb6 in conjunction with the operated armatures ha5, ha3 and ha6 extends the calling circuit by way of the wipers, negative 1, positive 1 and P1 of the finder over the dotted connections at IDF to the associated first selector accessible over the bracketed conductors shown. Moreover at armature hb2, earth from the operated armature ha1 is extended to the bank and wiper 1a of the switch PDS so as to cause the wipers to be advanced into engagement with the next idle finder after the release of the primary control set in connection with the call in question. It may be, however, that both the test wipers P1 and P2 will encounter marking batteries from different calling lines at the same instant, in this case relay 1P in operating will take precedence over relay 2P since the locking circuit of the latter includes a resting armature of relay 1P. It should be explained that the metal rectifiers RCT3 and RCT4 have been included in the circuit of relays 1P and 2P so as to prevent their false operation in case the test wipers encounter, during rotation, a contact to which booster battery potential is connected during the metering conditions of another circuit. It will be appreciated that under booster battery conditions current would tend to flow in the opposite direction to that which normally obtains and for this purpose the metal rectifiers are connected up in such sense as to oppose this current flow.

Relay LK in releasing owing to the short-circuiting effect of armature co6 in turn drops relays RS and VR, the circuit of relay SF is opened at armatures vr3 and lk2 whereupon relay SF releases and opens the holding circuit to relays 1P and CO and the primary control set PC1 is thereupon restored to normal. It should be explained, however, that the circuit to relays 1P and CO will be maintained during the slow releasing period of relay SF so that a holding earth will be maintained to relays K and L in the line circuit and the switching relay HA or HB in the finder until the operation of the release relay in the associated first group selector which thereupon returns earth over the test conductor to provide a holding circuit alternative to that completed by way of the armatures of relays 1P and CO.

If the calling subscriber should abandon the call during the finding operation relay ST will release and the finder is thereupon restored to normal. If, however, more than one call is in progress at this time, relay ST will be maintained by other calling circuits and the finder will then run to the 11th step and release, or alternatively locate a second caller's line and switch through. In the 11th step position the test wipers P1 and P2 encounter battery by way of the resistance YO and YP which serves to effect the switching-through operation as in the case of a contact marked by a calling line, but under these circumstances this operation is without material effect since the 11th position line contacts are unwired, upon the release of the primary control set the initial circuits will be opened to relays HA and HB whereupon a circuit is completed to the release magnet ZM so that the shaft and wipers will be restored to the normal position.

Operation of the calling subscriber's meter MTR, Fig. 1, is effected when the called subscriber replies, by the application of booster battery potential in place of earth to the release trunk conductor 22 by the controlling switch in the train. In the case of only a single registration the meter will be connected direct to battery. If, however, the circuit is to be used in a system employing zone metering when more than one registration will be required for each call, the meter is connected to earth by way of a rectifier RCT5 connected up in such sense as to oppose a current flow which would otherwise be possible by way of the windings of relays K and L in series. The meter is operated each time booster battery is connected to the release trunk conductor and is caused to release after each metering impulse since it is then short-circuited by the guarding earth connection to the release trunk conductor.

Upon the normal release of a connection when the calling subscriber replaces his receiver, holding earth is removed from the release trunk conductor 22, Fig. 3, by the controlling switch in the train whereupon the relevant switching relay in the finder and the K and L relays of the calling circuit in use are restored and the finder is released by the energization of the release magnet ZM.

Consideration will now be given to the case when all regular finders of the group in question are in use so that further calls will require to be extended over an overflow finder having access to a selector in a common group by way of the secondary finder such as SCF, Fig. 3. Owing to the fact that all regular finders are in use the short-circuiting earth extending by way of the resting off-normal springs N3 of all regular finders to the common conductor 23 will be removed from relays RFZ and RFB. When a further call is initiated during this period, relay ST will again operate to set the primary distributor switch PDS searching for a free finder and upon the operation of the common low resistance relay BP, which is included in the circuit to the driving magnet, an operating circuit will be completed at armature *bp1* for relays RFZ and RFB in parallel to battery via a resistance conveniently wound on the core of the latter relay. Relay RFB in operating, at armature *rfb1* completes a locking circuit for itself and relay RFZ, alternative to that provided by way of the armature *bp1*, at armature *rfb2* prepares a circuit to relay OFB which is similar in function to RFB but is connected to the resting off-normal springs of all overflow finders, at armature *rfb3* the operating battery for relays ST and G is transferred by way of the resistance YL to the control of relay EB, at armature *rfb4*, Fig. 3, earth is connected to the common conductor 24 extending to the OB relays of all the secondary control sets such as SC1 which are operated in a manner which will be fully described later, at armature *rfb5* earth is connected to a common conductor 25 extending to relay EB which is provided one per exchange, this relay is inoperative until all the first selectors in the common overflow group have been taken into use, at armatures *rfb6* and *rfb7*, Fig. 1, earth is disconnected from common conductors 26 and 27 and replaced by the common operating battery extended via resistances YM and YN. The common conductors 26 and 27 extend to off-normal springs N1 of all the overflow finders in the group in the same way as the common conductors 16 and 28 extend to the off-normal springs of all the regular finders in the group. It will be appreciated, of course, that the resistances YM and YN which supply the initial operating battery for relays LK in the primary control sets could if necessary be replaced by a single resistance, but in order to guard against the possibility of disorganization of the service owing to the blowing of a fuse, it has been thought advisable to fuse one half of the finders separately from the other half so that in the case of such trouble at least one half of the finders will be available to maintain the service.

It will be appreciated, however, that the change-over arrangements effected by armatures *rfb6* and *rfb7* will only be necessary in certain cases, that is when both regular and overflow finders are accommodated on the banks of a single distributor switch, under which circumstances the earth extended by way of the resting contacts of the change-over armatures *rfb6* and *rfb7* will mark the overflow finders busy as long as finders are available in the regular group. In the present example, however, it is assumed that the overflow finders are accommodated on the banks of the separate overflow distributor switch designated ODS so that the necessity for such busying arrangements then disappears and the operating battery extending by way of the resistances YM and YN may be directly connected to the overflow finders.

Referring now to the operation of relay RFZ which is provided per group of distributors, at armature *rfz1* earth is disconnected from the 25th bank contact of the switch PDS and a circuit is prepared for the operation of relay OFC which is individual to each distributor, at armatures *rfz2* and *rfz3* (not shown), earth is disconnected from the 25th bank contact of the two other distributors similar to PDS while at armature *rfz4* earth is connected to common conductor 29 to prepare a locking circuit for relay OFC and two similar relays.

Since all the finders in the regular group are busy the wipers of the primary distributor PDS will be rotated around the bank contacts until wiper *1a* arrives in its 25th position when a circuit is completed for the operation of relay OFC on its upper winding in series with relay LK. Relay LK does not operate as its circuit is immediately opened at armature *ofc4*. Relay OFC in operating, at armature *ofc1* opens the short circuit to its lower winding so that it may hold to earth on the common conductor 29, at armature *ofc2* prepares a locking circuit to its upper winding under the control of relay LK so that it will be held operated for the duration of the call in progress to maintain the "all regular finders busy" condition even though a regular finder should become available and result in the release of relays RFZ and RFB. At armatures *ofc3* and *ofc4*, the testing circuit of the primary control set PC1 is extended by way of the wipers *1b* and *2b* of the overflow distributor switch ODS to a finder in the overflow group, while the other wipers of this switch designated *3b* to *8b* are similarly extended to the control set by way of the 25th bank contacts and wipers *3a* to *8a* of the primary distributor switch PDS. Moreover at armature *ofc*5 the driving circuit controlled by relay G is transferred to the driving magnet ODM of the overflow distributor. In case the first overflow finder encountered over the wipers of the overflow distributor switch ODS is busy, owing to its being removed for testing purposes or its being engaged by another distributor, then wiper 1*b* will encounter earth which short-circuits relay LK and allows the driving circuit to the magnet ODM to continue.

Assuming now for the purposes of this description that the finder shown in Fig. 2 is one of the overflow group, then the connections shown in full lines at the intermediate distributing frame IDF will apply and the overflow distributor ODS will require to make a dual test, to select a free overflow finder over wiper 1*b* and to select a free secondary finder having access to this overflow finder over wiper 2*b*. Under these conditions, therefore, an available finder in the overflow group will be indicated to the overflow distributor ODS by the presence of resistance battery on the contact encountered by wiper 1*b* and the absence of earth on the contact encountered by wiper 2*b*.

It will be noted that relay G is connected to the wipers 1*b* and 2*b* through the rectifiers RCT1 and RCT2 so that although the relay G is able to test over both these wipers, they are isolated from one another since the two rectifiers are connected in opposition. The rectifiers thus prevent relay LK from being operated when wiper 1*b* encounters earth while wiper 1*a* encounters battery and vice versa.

It should be explained that immediately all the regular finders in a primary group become busy and a further call is initiated, the whole of the group of secondary finders having access to the overflow finders in the particular primary group is opened up, and secondary distributors such as SED, Fig. 3, are caused to preselect idle secondary finders such as SCF and the manner in which this is effected will now be described.

As already mentioned, relay RFB in operating connects earth to a common conductor 24 extending to the OB relays of all secondary start groups such as SS1, which for the purpose of this description will be assumed to be two in number. It should be mentioned that conductor 24 extends at one end to the OB relays of all the secondary start groups and extends at the other end to the armatures such as *rfb*4 of all the primary start groups such as PS1 to which the secondary start groups have access.

Considering now the functions of the particular secondary start group SS1 shown, assuming that at least one secondary finder is available in the group it is arranged to start, relay OB will be operated over the circuit: earth on the common conductor 24, winding of relay OB, common conductor 30, which extends to all secondary finders such as SCF associated with the secondary start group SS1, resistance YB provided per secondary finder, armatures *sk*1 and *sk*5, winding of resistance YA per secondary finder to battery. Relay OB in operating, at armature *ob*1 connects earth to common conductor 31 to short-circuit relay EB which is common to the change and at armature *ob*2 operates relay FB. The operation of relay FB at armatures *fb*1, *fb*2 and *fb*3 removes earth from the common conductors 32, 33 and 34 extending to bank contacts of overflow distributors ODS in all the primary finder groups provided with overflow finders accessible to the secondary finder group which includes the secondary start group SS1. Moreover at armatures *fb*4, *fb*5 and *fb*6, three secondary distributors such as SED will be connected up so as to preselect three idle secondary finders such as SCF in the group of finders controlled by the secondary start group SS1.

The necessity of three windings on relay DS will be more fully appreciated from the description of the typical cross connecting trunking diagram, Fig. 9, which will be fully described later. It should be made clear at this point, however, that each branch conductor from conductor 32 extends to a separate contact in the bank engaged by wiper 2*b* of the distributor ODS, similarly each branch conductor from conductor 33 extends to a separate contact in the corresponding bank of the distributor ODS2 whilst each branch conductor from conductor 34 extends to a separate contact in the corresponding bank of the distributor ODS3. It will be understood, of course, that there are no multiple connections between the banks engaged by wipers 2*b* of distributors ODS, ODS2 and ODS3.

Considering now the operation of the particular secondary distributor SED shown in the drawings, upon the closure of armature *fb*4 and assuming that the wipers 1*c* to 4*c* of the distributor SED are in engagement with contacts extending to a secondary finder which is already in use, wiper 1*c* will encounter earth from an operated armature similar to *sk*2 and this is extended by way of the low resistance left-hand winding of relay DK, armature *dk*1, interrupter springs *sem*, armature *fb*4, winding of high resistance relay GG, wiper 3*c* and bank contact, interrupter springs similar to *sem* of the secondary finder SCF to battery. Owing to its high resistance, relay GG only is operated in this circuit and at armature *gg*1 completes an energizing circuit to the driving magnet SEM of the secondary distributor SED. As will be seen from the drawings, the circuit of relay GG includes the interrupter springs *sem* operated by the magnet SEM at the conclusion of its mechanical stroke, and it will be evident therefore that an alternate action will take place between this relay and the magnet so that the wipers 1*c* to 4*c* of the distributor are advanced step-by-step into engagement with a free secondary finder SCF as indicated by the absence of earth potential on the contact encountered by wiper 1*c*. In this manner, therefore, three secondary finders in both groups controlled from the secondary start group SS1 will be preselected; no further circuit operations will take place in the secondary finder group until the overflow distributor ODS has located a free overflow primary finder.

Assuming now that the overflow finder selected is accessible to secondary finders of the group controlled by the secondary start circuit SS1, then wiper 2*b* of the switch ODS will be in engagement with a contact extending to one of the common conductors 32, 33 or 34 in circuit with the windings of relay DS shown in Fig. 3.

The hunting operation of the overflow finder selected will continue without interruption until the calling line is located, whereupon one or other of the testing relays 1P or 2P will operate but the switching through of the finder is suspended since there is no circuit for relay SF until one of the secondary finders taken into use locates the overflow finder selected which latter is marked upon the operation of relay VR in the bank multiple associated with wiper 1*d* of the secondary finder SCF by battery connected through relay SF.

When relay LK operated upon an available overflow primary finder being selected it completed a circuit as follows: earth, armature *lk*2, armature *tb*6, wiper 2*a* and 25th bank contact of the switch PDS, armature *ofc*3, wiper 2*b* and bank contact of the switch ODS, terminal 19 at IDF, Fig. 3, common conductor 32, upper winding of relay DS to battery. Relay DS operates and at armatures *ds*1, *ds*2 and *ds*3 completes switching circuits for relays DK in the three secondary control groups.

Considering now the particular group SC1 shown in the drawings, upon the application of earth to the winding of relay DK, the latter is operated on both its windings in series to battery by way of the resistance YA of the secondary finder SCF selected, thereby at armature *dk*1 short-circuiting its high resistance right-hand winding so that the relay then holds on its low resistance winding; earth potential connected over armatures *ds*1 and *dk*1, through the low resistance left-hand winding of relay DK to the bank contact associated with the secondary finder SCF serves to guard it against selection from another secondary distributor. At armature *dk*2 the connection from armature *gg*1 is transferred by way of wiper 4*c* and bank contact to the magnet SCM of the secondary finder SCF and at armatures *dk*3 and *dk*4 a circuit is completed to the interrupter relay GG which is effective or not depending upon the condition of the contact engaged by wiper 1*d* of the secondary finder SCF.

Assuming now that the wiper 1*d* is in engagement with a contact other than that marked by the connection of battery through the winding of relay SF in the primary control set then a circuit will be effective to relay GG from earth at the armature *dk*4, comparatively high resistance left-hand winding of relay FK, armatures *fk*2 and *dk*3, winding of high resistance relay GG, wiper 3*c* and bank contact to battery by way of the interrupter springs *scm* controlled by the driving magnet SCM. Relay GG in operating completes an energizing circuit to the magnet SCM which prepares for the advancement of the wipers of the secondary finder into engagement with the next set of bank contacts, and since the energizing circuit of relay GG includes the interrupter springs *scm* controlled by the driving magnet SCM then an alternate action will take place between the relay GG and the magnet SCM until the wipers of the secondary finder are rotated into engagement with the marked bank contact.

The number of contacts in the banks of the secondary finders will depend upon the number of overflow finders to be connected with by the group of secondary finders but may conveniently be of the rotary line switch type having access to 25 lines or to 50 lines if two sets of wipers are provided. These switches will be of the non-homing type so that the simultaneous searching of three switches will considerably reduce the finding time.

Assuming now for the sake of example that the secondary finder shown is the first to encounter the marked bank contact, relay GG will not again be operated since its winding is shunted by the presence of the comparatively low resistance battery encountered by wiper 1*d* so that the searching operation will be terminated. Relays SF and FK operate in series with relay SK which, however, does not operate at this time. Relay SF in operating enables the switching operation of the overflow finder to take place by connecting up relay CO in the manner already described, while relay FK in the secondary control circuit in operating, at armature *fk*1 opens a further point in the magnet circuit and at armature *fk*2 shunts its comparatively high resistance left-hand winding by its low resistance right-hand winding to permit the operation of relay SK in the secondary finder over its low resistance lower winding. Relay SK in operating at armature *sk*1 disconnects an idle marking battery from the common conductor 30 and prepares a locking circuit to relay SK over the release trunk conductor, at armature *sk*2 connects direct earth to the bank contacts of the distributor switches such as SC1 to prevent the selection of the secondary finder whereupon the relay DK releases, and at armatures *sk*3, *sk*4 and *sk*5 extends the negative, positive and release trunk conductors of the overflow finders by way of the bank contacts and wipers 4*d*, 3*d* and 2*d* of the secondary finder switch SCF to the bracketed negative, positive and release trunk conductors extending to a first group selector in the common group. It should be explained that relay SF in the primary control set and relays SK and FK in the secondary circuit remain held in series until earth is extended back along the release trunk conductor 43 by the operation of the release relay in the first group selector, the earth fed back serves to hold relay SK over its upper winding and also the switching relay in the finder and the L and K relays in the calling subscriber's circuit.

Due to the operation of relay CO, relays LK and VR release in turn in the manner previously described. Due to the release of relay VR, the series holding circuit of relay SF and FK is opened at armature *vr*3, relay FK upon releasing completes the circuit of magnet SEM and the secondary distributor SED is now advanced into engagement with the next available secondary finder in the manner already described. Due to the release of relay LK, earth is disconnected from the upper winding of relay DS at armature *lk*2 whereupon relay DS releases unless it is being energized over one of its other windings from another primary finder group.

Considering now the condition when the last overflow finder in the group is taken into use, earth will be removed from the common conductor 35 extending to relay OFB, Fig. 5, by the off-normal springs N3 of all overflow finders, during the setting operation of the last overflow finder relay VR will be operated and at armature *vr*6 maintains relay OFB short circuited. At the conclusion of the setting operation, however, when the primary control set is restored to normal, relay VR will release and relay OFB is thereupon operated from battery by way of the resistance conveniently wound on its core, and at armatures *ofb*1, *ofb*2 and *ofb*3, Fig. 4, transfers the start circuits for the various primary control sets to overflow meters (not shown) individual to each set, so that in the case of further calls during this condition registration will be made on the particular overflow meter. In case, however, an overflow finder should become free meanwhile, relay OFB will release to open up the primary control sets and moreover in case a regular finder should become free relays RFB, RFZ and OFB will restore to open up the primary control sets for access to the regular finder group. If all the secondary finders under the control of the start group SS1 become busy, relay OB will release due to the removal of all battery connections from conductor 30. Relay FB will in turn release and will prevent useless hunting of the associated secondary distributor SED by allowing armatures *fb*4, *fb*5 and *fb*6 to release.

It is conceivable, although very improbable, that the condition may arise when all secondary finders in the exchange are in use at the same instant and this will have the effect of restoring all the OB relays in the exchange. At armatures *ob*1 earth will be removed from the common conductor 31 and as relay EB is then no longe short-circuited it operates from earth on the common conductor 25, to battery by way of a resistance conveniently wound on its core. Relay EB which is common to the whole exchange is provided with two armatures *eb*1 and *eb*2, Fig. 5, arranged to disconnect battery from the common conductor 36 extending to all the primary control sets so as to prevent the useless hunting of the distributor switches ODS in case further calls are initiated during this period.

As already mentioned in the early part of the description, relay ST in operating is arranged to connect up the delayed alarm changeover set which functions in case the primary control set is not freed within a predetermined period of time. Considering now the operation of this changeover set in detail, relay ST in operating at armature *st*1, Fig. 4, extends earth over common conductor 37 which sets in operation a motor arranged to drive the cam assembly 38 which applies an earth impulse to the S and Z pulse conductors having a definite period of time between each application. When earth is applied to the S pulse conductor a circuit is completed for operating relay TA over its upper winding and this relay in turn at armature *ta*1 connects the lower winding of relay TB in circuit with the Z pulse conductor, and at armature *ta*2 completes a locking circuit for itself over its lower winding in series with the upper winding of relay TB which is adjusted to hold but not to operate under these conditions.

Assuming now that the control equipment fails to release after the predetermined period, an impulse will be delivered over the Z pulse conductor which serves to operate relay TB over its lower winding, and this relay at armature *tb*1 disconnects the circuit of relay LK and extends earth to a common conductor 39 to actuate an alarm associated with the particular rack upon which the equipment is mounted, at armature *tb*2 extends earth over another common conductor 40 to set in operation a main alarm which is common to the exchange, at armature *tb*3 opens the original energizing circuit of relay TA, at armature *tb*4 completes a locking circuit for itself to the fault release test jack TFR in parallel with an individual fault alarm lamp FAL, at armature *tb*5 transfers the start circuit on to the primary control set PC3, and at armatures *tb*6 and *tb*7, Fig. 5, disconnects the driving circuit of the distributor. Relay TA releases and opens the initial energizing circuit of relay TB at armature *ta*1. If, however, the primary control set has become associated with a finder, relay LK will be operated and therefore relay TC will operate in parallel with relay TB from the Z pulse conductor. Relay TC in operating at armatures *tc*1 and *tc*2, Fig. 5, disconnects the circuit to the switching relays HA and HB, at armature *tc*3 connects direct earth to the wiper *1a* and bank contact of the distributor to busy this finder against selection by another distributor, and at armature *tc*4 locks itself on its right-hand winding to earth on the fault release test jack TFR. Upon the release of relays HA and HB the finder selected is restored to normal, in which position a circuit may be traced from earth at the off-normal springs N4, Fig. 2, conductor 41, bank contact and wiper 6*a* of the distributor switch, armature *tc*1, wiper 7*a* and bank contact of the distributor switch, conductor 42, winding of the switching relay HB to battery. Relay HB in operating removes the shunt earth from conductor 23 extending to relays RFZ and FRB to indicate this finder as busy, while earth is extended from the resting armature *ha*1, operated armature *hb*1, test jack springs T to the testing bank contact of the distributor switch to supplement the earth connected up at armature *tc*3 by way of wiper *1a* and still further marks the finder as busy against selection. In this manner, therefore, the circuit is locked as busy until the fault is cleared whereupon the attendant will momentarily open the fault release test jack springs TFR to restore the circuit to normal.

In case a regular first group selector is artificially busied for test purposes by the connection of earth to the release trunk conductor 22, Fig. 3, this earth will find a circuit by way of the vertical bank and wiper VW in its normal position to operate relay HB over its right-hand winding, and this relay busies the associated finder in the manner already described. In case a first group selector associated with a secondary finder is artificially busied for test purposes earth connected to the release trunk conductor 43, Fig. 3, serves to short-circuit the idle marking battery YA insofar as its function in holding relay OB is concerned, although it will be appreciated owing to the presence of resistance YD in the circuit, relay OB will remain held from the idle marking batteries of other free secondary finders in the same group.

In case it becomes necessary to routine the finders during non-busy conditions, this may be effected by short-circuiting the test jack springs TRE, Fig. 4, this affects the operation of the start relay ST to associate the primary control set PC1 with a free finder, and as a corresponding marking has not been made in the vertical bank multiple the finder will be caused to rotate to the 10th level where the wiper VW will encounter a permanent battery connection, whereupon the finder will cut in and automatically rotate to its 11th rotary position where the test wipers P1 and P2 will encounter battery through the resistances YO and YP. By this means the finder is switched through to bring about the release of the primary control set and as there are no line connections to the 11th position line contacts the switching relay will release and restore the finder to normal. During the operated condition of the switching relays, however, earth is connected to the bank contact and wiper *1a* which causes the distributor switch PDS to move into engagement with the next finder, and upon the re-operation of relay ST when relays VR and CO release the same sequence of operations will be repeated in respect of the next finder. Consequently so long as the test jack TRE remains short-circuited the routining operation will continue and each finder will be taken into use in turn and then released after completing its vertical and rotary hunting operations.

In order that the cross connections between the secondary finders and the overflow primary finders may be more readily appreciated a typical trunking arrangement has been shown in Fig. 9. On the left-hand side of this figure are shown schematically the groups of primary distributors for five separate 200-line groups and these have been designated DG1, DG2, DG3, DG4 and DG5 respectively, each having access over its first set of contacts to regular line finders RLF directly connected to first selectors, and having access over its second set of contacts to overflow finders OLF having access to group selectors in two common groups accessible by way of the secondary finder groups shown on the right-hand side of the drawings designated SFG1 and SFG2.

Considering now the dotted cross-connecting leads it will be seen that in each of the 200-line groups, overflow finders 1 and 3 are accessible to selectors in the common group served by secondary finders SFG1, while overflow finders 2 and 4 are accessible to selectors in the common group served by secondary finders SFG2. Although not shown it must be assumed that the secondary finders are selected by secondary distributors such as SED, Fig. 3, and these are in turn started from a secondary start group such as SS1. It will be appreciated, therefore, that in case of an overflow condition arising in any of the 200 line groups DG1 to DG5, the whole of the secondary group must be opened up since the distributor may select an overflow finder accessible to either group SFG1 or group SFG2.

Assuming that an overflow finder served by secondary group SFG1 is taken into use then the corresponding DS relay such as that shown in Fig. 3 will be operated to cause three secondary finders to hunt, while the secondary finders in the group SFG2 although preselected are not caused to hunt since the corresponding DS relay of their secondary start group has not been operated. In case, however, the overflow finder taken into use is served by the secondary group SFG2 then the DS relay associated with the other start group will be operated to cause three secondary finders in the group SFG2 to hunt.

Since, however, two overflow finders from each 200-line group are served from the same secondary finder group the necessity for the multiplicity of windings on relay DS will now become apparent; as a specific example it will be assumed that overflow finder No. 1 is taken into use from the distributor ODS, and is associated by way of a secondary finder with a selector served by group SFG1. During the setting operation relay LK in the control set PC1 will be operated so as to complete the circuit to relay DS of the secondary start group. Assuming now that a further call is initiated in the same 200 line group then another distributor, e. g. ODS2, may select the overflow finder No. 3 which is served by the same secondary finder group SFG1, so that the operation of the LK relay in the control set PC2 will also complete a circuit to relay DS to cause secondary finders in the group SFG1 to hunt. If, however, the operating circuits from the separate LK relays in the control sets serving the first primary finder group were connected to a single winding of relay DS, the contacts in the banks 2b of the overflow distributors serving the first primary finder group would be connected together; consequently, upon the operation of one LK relay following the selection of the particular secondary group by which the overflow finder is served, an earth connection would exist from the common point at the winding of relay DS to all the bank contacts engaged by wipers 2b of the overflow distributors serving the first primary finder group. This earth connection would prevent the selection of overflow finder No. 3 if another distributor serving the first primary finder group were set in operation at this time, since the condition is equivalent to the release of relay FB which indicates that all the secondary finders in this particular group are in use. To obviate this disadvantage the start circuits from distributors in the same primary group for overflow finders accessible to selectors served by the same secondary finder group are connected to different windings on relay DS. It should be mentioned that all the distributors in the same primary group will generally be dealing with an "all regular finders busy" condition at the same time whereas the distributors in different primary groups will generally be dealing with an "all regular finders busy" condition at different times.

It will be appreciated that the arrangement described is typical only and that the secondary finders may be split up into any number of groups as is convenient depending upon the density of the traffic to be served and that for exchanges having a greater number of lines there may be plurality of primary and secondary finder units similar to that described with reference to Fig. 9.

We claim:—

1. In a telephone system, a group of primary finders for finding calling lines, a group of first numerical switches for extending calling lines toward called lines, certain of said primary finders being directly connected to corresponding ones of said first numerical switches, secondary finders connected to the remaining first numerical switches, and the remaining primary finders of said group having access to said remaining first numerical switches by way of said secondary finders.

2. In a telephone system, a group of primary finders for finding calling lines, a group of first numerical switches for extending calling lines toward called lines, certain of said primary finders being directly connected to corresponding ones of said first numerical switches, secondary finders connected to the remaining first numerical switches, the remaining primary finders of said group having access to said remaining first numerical switches by way of said secondary finders, a rotary distributor switch for allotting said primary finders for use in turn, and another rotary distributor for allotting said secondary finders for use in turn.

3. In a telephone system, a group of primary finders comprising regular finders and overflow finders for finding calling lines, a first numerical switch being directly connected to each regular finder, secondary finders having access to said overflow finders, other first numerical switches each directly connected to one of said secondary finders, means responsive to a call for taking an overflow finder into use only in case all the regular finders are busy, and means for associating said overflow finder with an idle one of said other first numerical switches by way of the connected secondary finder.

4. In a telephone system, a group of primary finders comprising regular finders and overflow finders for finding calling lines, a first numerical switch being directly connected to each regular finder, secondary finders having access to said overflow finders, other first numerical switches each directly connected to one of said secondary finders, means responsive to a call for taking an overflow finder into use only in case all the regular finders are busy, means for associating said overflow finder with an idle one of said other first numerical switches by way of the connected secondary finder, a rotary distributor having access to both said primary and overflow finders for allotting such finder for use, and means for marking said overflow finders busy to said distributor as long as a primary finder is available for use.

5. In a telephone system, a group of primary finders comprising regular finders and overflow finders for finding calling lines, a first numerical switch being directly connected to each regular finder, secondary finders having access to said overflow finders, other first numerical switches each directly connected to one of said secondary finders, means responsive to a call for taking an overflow finder into use only in case all the regular finders are busy, means for associating said overflow finder with an idle one of said other first numerical switches by way of the connected secondary finder, a rotary distributor having access to both said primary and overflow finders for allotting such finder for use, means for marking said overflow finders busy to said distributor as long as a primary finder is available for use, and means responsive to all said primary finders becoming busy for rendering the overflow finders available for use.

6. In a telephone system, a group of primary finders for finding calling lines and for extending calling lines toward called lines, secondary finders having access to only a portion of said group of primary finders, and means for taking said secondary finders into use only in case all the finders in the other portion of said group are busy.

7. In a telephone system, a group of finders for finding calling lines, a group of first numerical switches for extending said lines toward called lines, certain of said finders being directly connected to corresponding ones of said first numerical switches, secondary non-numerical switches being directly connected to the remaining first numerical switches in said group, the remaining finders of said group having access to said remaining first numerical switches by way of said secondary switches, and means for taking said finders into use in a definite order, the finders first taken into use being those directly connected to said first numerical switches and the finders subsequently taken into use being those having access to first numerical switches by way of said secondary switches.

8. In a telephone system, a plurality of groups of primary finders, a plurality of groups of secondary finders having access to only certain of the primary finders in each group, and different primary finders in the same group being accessible to secondary finders in different groups.

9. a telephone system, two groups of finders, each group of finders comprising two classes of finders, and means for taking the finders in the second class into use only in case the finders in the first class of both groups of finders are busy.

10. In a telephone system, a first and a second group of lines, a corresponding group of finders for each group of lines, a third group of finders for both groups of lines, a start lead for each group of lines normally connected to its corresponding group of finders, means responsive to calls by said lines for taking the corresponding group finders into use over said start leads, means for transferring said start leads to the second group of finders when the first group becomes busy, and to the first group of finders when the second group becomes busy, and means for transferring said start leads to the third group of finders when both the first and second groups become busy.

11. In a telephone system, a group of primary finders comprising regular finders and overflow finders for finding calling lines, a first numerical switch being directly connected to each regular finder, secondary finders having access to said overflow finders, other first numerical switches each directly connected to one of said secondary finders, means responsive to a call for taking an overflow finder into use only in case all the regular finders are busy, means for associating said overflow finder with an idle one of said other first numerical switches by way of the connected secondary finder, and means for operating one of said overflow finders in response to a call only after one of said other first numerical switches is connected to such primary finder by way of one of said secondary finders.

12. In a telephone system, a group of lines, a corresponding group of finders for said group of lines, said group of finders divided into three sub-groups, said group of lines divided into two sub-groups, a start lead for each sub-group of lines, the start lead of said first sub-group of lines normally connected to the first sub-group of finders and the start lead of said second sub-group of lines normally connected to the second sub-group of finders, means responsive to a call by a line in said first sub-group of lines for taking one of said first sub-group finders into use over said first sub-group start lead, means for transferring said first sub-group start lead to the second sub-group of finders when the first sub-group of finders becomes busy, means responsive to a call by a line in a second sub-group of lines for taking one of said second sub-group finders into use over the second sub-group start lead, means for transferring said second sub-group start lead to the first group of finders when the second sub-group of finders becomes busy, and means for transferring said start leads to said third group of finders only in case both said first and second sub-groups of finders are busy.

13. In a telephone system, a group of finders having operating magnets, common control apparatus for controlling said magnets to operate said finders to find calling lines, a release magnet in each finder for releasing the same, a circuit for each release magnet, and contacts individual to each finder for controlling its individual release magnet.

14. In a telephone system, a group of lines, a group contact for said lines, a group of finders for said lines, means responsive to a call on one of said lines for marking said group contact with a calling potential and for operating an idle one of said finders in one direction to hunt for said marked contact, means responsive to said finder finding said marked contact for stopping the movement of the finder in its first direction and for operating said finder in a second direction to find the calling line, and means in said finder for marking said contact with a busy potential during the operation of said finder in its second direction to mark this contact busy to other finders hunting in their first direction.

15. In a telephone system, a group of lines, a group of finders having access to said lines, a distributor including wipers for allotting idle ones of said finders for use in turn, means responsive to a call for operating an idle one of said finders by way of said distributor to search for the calling line, a switching relay in said finder, means including a test wiper on said finder for stopping said finder on the calling line in response to said test wiper finding the calling line, and means including a wiper of said distributor for energizing said switching relay independent of said test wiper to extend the calling line.

16. In a telephone system, a group of lines, a group of finders having access to said lines, a distributor having access to said finders, a magnet in said distributor, a stepping relay in said distributor for operating said distributor magnet to control said distributor to select an idle one of said finders, a stepping magnet in each of said finders, means responsive to a call on one of said lines for seizing the finder selected by said distributor, and means controlled by said stepping relay in said distributor for controlling the stepping magnet of the selected finder to operate said finder step by step in search of the calling line.

17. In a telephone system, a group of lines, a group of finders having access to said lines, a primary magnet in each finder, a secondary magnet in each finder, common control apparatus having access to said finders, a conductor individual to each of said finders, means responsive to a call on one of said lines for operating said apparatus to seize an idle one of said finders, and means in said apparatus for operating the primary and secondary magnets of the seized finder over the associated individual conductor to operate said finder in search of the calling line.

18. In a telephone system, a group of lines, a group of finders having access to said lines, a primary magnet and a secondary magnet in each of said finders, common control apparatus having access to said finders, a conductor individual to each finder, means responsive to a call for operating said apparatus to seize an idle one of said finders, means in said apparatus for operating the primary and secondary magnets of the seized finder over the associated individual conductor to operate said finder in two directions to find the calling line, a switching relay in said finder for extending the calling line, and means in said apparatus for operating said switching relay to switch said individual conductor from said primary magnet to said secondary magnet.

19. In a telephone system, a group of lines, a group of finders, two sets of wipers in each finder having access to said lines, two corresponding switching relays in each finder, means responsive to a call for operating an idle one of said finders in search of the calling line, means for energizing both said switching relays during the searching operation of said finder, and means for subsequently releasing one of said switching relays to switch the calling line through.

20. In a telephone system, a group of lines, a group of finders, two sets of wipers in each finder having access to said lines, two corresponding switching relays in each finder, a primary magnet and a secondary magnet in each finder for operating such finders in a primary and then a secondary movement, means responsive to a call for seizing an idle one of said finders, means for operating the primary and secondary magnets of the seized finder to operate said finder in its primary and secondary movements in search of the calling line, means for energizing both said switching relays during the searching operation, one of said relays energized at the end of the primary movement to change over the operating circuit from the primary magnet to the secondary magnet, and means for subsequently releasing one of said switching relays to switch the calling line through.

21. In a telephone system, lines, a group of line finder switches including normally employed line finders and reserve line finders, secondary finders having access to said reserve line finders, group selectors one for each of said normally employed line finders and one for each of said secondary finders, and means effective when all of said normally employed line finders are busy for initiating the operation of said secondary finders to select an idle reserve line finder for establishing connection with the calling line.

22. In a telephone system, lines, a group of line finder switches including normally employed line finders and reserve line finders, secondary finders having access to said reserve line finders, group selectors one for each of said normally employed line finders and one for each of said secondary finders, and means for preventing the operation of said reserve line finders as long as any of said normally employed line finders remain idle.

REGINALD TAYLOR.
JAMES ALFRED MASON.